US007075240B2

(12) United States Patent
Fryer et al.

(10) Patent No.: US 7,075,240 B2
(45) Date of Patent: Jul. 11, 2006

(54) CONTROL OF ELECTROLUMINESCENT DISPLAYS

(75) Inventors: Christopher James Newton Fryer, Cottenham (GB); Stefan Michael Ross, Westfield Lane (GB)

(73) Assignee: Pelikon Limited, Caerphilly (GB)

( * ) Notice: Subject to any disclaimer, the term of this patent is extended or adjusted under 35 U.S.C. 154(b) by 0 days.

(21) Appl. No.: 10/628,581

(22) Filed: Jul. 28, 2003

(65) Prior Publication Data

US 2005/0007027 A1 Jan. 13, 2005

(30) Foreign Application Priority Data

Jul. 7, 2003 (GB) ................................ 0315871.4

(51) Int. Cl.
*G01G 3/10* (2006.01)

(52) U.S. Cl. .............................. 315/169.3; 315/169.1; 345/76

(58) Field of Classification Search ............ 315/169.1, 315/169.3, 291, 307, 209 R; 345/76, 77, 345/78, 211–214
See application file for complete search history.

(56) References Cited

U.S. PATENT DOCUMENTS 3,409,876 A 11/1968 Uphoff ........................ 345/76
3,947,722 A * 3/1976 Strom et al. ............. 315/169.4
4,782,269 A * 11/1988 Haferl ......................... 315/371
5,311,169 A * 5/1994 Inada et al. .................... 345/77
5,745,085 A * 4/1998 Tomio et al. ................. 345/63
6,215,462 B1 * 4/2001 Yamada et al. ............... 345/76
6,541,921 B1 * 4/2003 Luciano et al. .......... 315/169.3

FOREIGN PATENT DOCUMENTS

EP 0817536 1/1998
WO WO 2004/015669 A1 2/2004

* cited by examiner

*Primary Examiner*—Tuyet Vo
*Assistant Examiner*—Jimmy Vu
(74) *Attorney, Agent, or Firm*—Sutherland Asbill & Brennan LLP

(57) ABSTRACT

A controller 2 is provided for use with a multi-segment electroluminescent display 1. Control signals C1–C5 control a plurality of half H-bridges H1–H5, the terminals of the half H-bridges being connected respectively to ground 10 and to a high voltage DC supply 9 so that the half H-bridges each provide an AC voltage. One of said half H-bridges provides a common output Vcommon and the remaining H-bridges provide drive voltages V1–V4 for the segments of the display. During each cycle, the controller 2 causes the drive outputs V1–V4 to either be in phase or in anti-phase with the common output Vcommon. This selectively turns the segments on and off at a rate much higher than the human eye can perceive. The brightness of the segments is controlled by varying the proportion of the time that each segment is illuminated.

16 Claims, 3 Drawing Sheets

CONTROL OF ELECTROLUMINESCENT DISPLAYS

TECHNICAL FIELD

The present invention relates to electroluminescent displays and, in particular, to the control of the brightness of such displays and to electroluminescent displays with controllable brightness.

BACKGROUND OF THE INVENTION

Electroluminescent displays have selectively illuminable regions for displaying information. Such displays have the advantage over competing technologies that they can be large, flexible and are relatively inexpensive.

Although electroluminescent lamps were known in the 1950's, these had a short lifetime and it was not until the 1980's that a flexible electroluminescent device was developed. However, this was used as an LCD backlight and only recently have practical electroluminescent displays become available.

Electroluminescent displays generally comprise a layer of phosphor material, such as a doped zinc sulphide powder, between two electrodes. It is usual for at least one electrode to be composed of a transparent material, such as indium tin oxide (ITO), provided on a transparent substrate, such as a polyester or polyethylene terephthalate (PET) film. The display may be formed by depositing electrode layers and phosphor layers onto the substrate, for example by screen printing, in which case opaque electrodes may be formed from conductive, for example silver-loaded, inks. Examples of electroluminescent devices are described in WO 00/72638 and WO 99/55121.

An electroluminescent display of the general type described above is illuminated by applying an alternating voltage of an appropriate frequency between the electrodes of the lamp to excite the phosphor. Commonly, the phosphors used in electroluminescent displays require a voltage of a few hundred volts. Typically, such electroluminescent displays may have a capacitance in the range 100 pF to 1 μF.

Since only a small current is required, this comparatively high drive voltage can easily be produced from a low voltage DC supply by a circuit such as the well known "flyback converter".

This comprises an inductor and an oscillating switch arranged in series. In parallel with the oscillating switch, a diode and a capacitor are arranged in series. The switch oscillates between an open state and a closed state. In the closed state, a current flows from the DC supply through the inductor and the switch. When the switch is opened, the current path is interrupted, but the magnetic field associated with the inductor forces the current to keep flowing. The inductor therefore forces the current to flow through the diode to charge the capacitor. The diode prevents the capacitor discharging while the switch is closed. The capacitor can therefore be charged to a voltage that is higher than the DC supply voltage, and current at this voltage can be drawn from the capacitor.

In order to supply an alternating current to a load from a flyback converter, an H-bridge may be provided in parallel with the capacitor. In general, an H-bridge comprises two parallel limbs, each limb having a first switch in series with a second switch. On each limb between the first and second switches, there is a node, and the load is connected between the respective nodes of the limbs. Current can flow through the load in one direction via the first switch of one limb and the second switch of the other limb and in the other direction via the other two switches. The switches of the H-bridge are operated so that current flows through the load first in one direction and then in the other.

Where multiple electro-luminescent segments are provided to form a display, the segments are controlled by having a single high voltage rail of constant voltage that is selectively switched across the segments that are required to light. This is achieved by using a half H-bridge transistor configuration to drive a common, usually front, electrode and a number of half H-bridges to drive each of the multiple segments. The common electrode will be switched at a frequency in the region of a few tens of hertz to a few kilohertz. Segments that are not required to light will be driven with the same signal as the common electrode such that they see no net voltage. Segments required to light will be driven at the same frequency but in anti-phase with the common electrode such that they see an alternating voltage of peak-to-peak value that is twice that of the high voltage rail. This enables simple control of which segments light by control of the phase of their driving signals.

It will be appreciated that a result of this drive method is that all lit segments appear at nominally the same brightness. The brightness of all of the segments can be controlled by varying the voltage of the high voltage rail and/or by varying the switching frequency. The brightness of the segments increases with frequency. However, since all segments are driven at the same voltage and frequency, there is no means to vary the brightness of segments relative to each other.

SUMMARY OF THE INVENTION

According to the invention there is provided a display controller for use with an electroluminescent display, wherein the controller is arranged to vary the relative phase of signals applied to illuminated segment(s) of the display whereby the brightness of the segment(s) can be varied.

In the conventional arrangement, an element that is being illuminated is driven every cycle. In contrast, by varying the phase of the signals, the controller of the invention can selectively turn each segment on or off during every cycle of the oscillator in order to set the segment to a desired brightness. Maximum brightness is achieved by turning a segment on every cycle, half-maximum brightness by turning it on half of the time and so on. It utilises the little recognised fact that the optical emission from powder electroluminescent displays has a fast time response of the order of tens of microseconds. This is much faster than the response of the human eye. It is, therefore, possible to provide accurate control of the brightness by illuminating segments for a controlled fraction of the time without introducing a visible flicker.

The invention also extends to a corresponding method and so, viewed from another aspect, the invention provides a method of controlling an electroluminescent display comprising varying the relative phase of the drive and common signals applied to the illuminated segment(s) of the display whereby the brightness of the segment(s) can be varied.

As noted above, in order to turn a segment of an electroluminescent display on, a signal is applied to it that is in anti-phase to the signal applied to the common electrode. To turn it off the signal is applied in phase. The controller of the invention is preferably arranged, therefore, such that it applies signals to the elements that are either in phase or in anti-phase with the common electrode, whereby the proportion of the signals that are in anti-phase determines the brightness of the segment.

Generally, the controller controls the phase of the signals on a cycle-by-cycle basis. For example, a signal to a segment that is to be lit at maximum brightness would be in anti-phase to the common segment (an ON signal) on every cycle of the alternating drive and in phase (an OFF signal) for the remainder. A segment required to be lit at half of maximum brightness would be driven with a signal that is in anti-phase for half of the cycles and in phase for the other half. A segment required to be lit at one sixteenth of maximum brightness would have a signal applied in anti-phase every sixteenth cycle and in phase the remainder of the time. Preferably, such an arrangement is used to provide at least sixteen levels of brightness, but it is possible to achieve 32 or more linear steps of independent brightness control for each segment of a display without causing noticeable flickering.

It will be appreciated that for most brightness levels there is a number of different patterns of ON and OFF signals that will cause the segment to be at a given brightness level. For example, in a five-level system (four levels of brightness plus off) half brightness may be achieved by ON-OFF-ON-OFF or ON-ON-OFF-OFF. Where a larger number of brightness levels is to be provided then the possible number of these patterns increases.

Where the display is driven at high frequency and the number of levels of brightness is moderate, it may not be of particular importance which pattern is chosen. However, it has been recognised that if the ON signals are permitted to cluster, rather than being evenly distributed in time, there will be an increased tendency for the display to flicker. Preferably, therefore, the controller is arranged to provide a pattern for each level of brightness that minimises clustering of drive signals. A gap between ON signals is essentially equivalent to a lower frequency drive signal component and so this arrangement effectively increases the minimum drive frequency of the display.

It will be appreciated that it is not possible to make the intervals between ON signals entirely even. For example in a sixteen-level-plus-off system, a brightness of 3/16 of maximum will require the ON signals to be separated by two intervals of 4 units and one of 5 units during each repeating pattern. Thus, the clustering is preferably reduced to the lowest level consistent with the number of cycles over which the pattern repeats, as in this example. However, in many cases a lesser degree of minimisation of clustering may be sufficiently effective.

The pattern used may be calculated in real time, but this is likely to require excessive computing power for a simple display device and so preferably the controller further comprises a look-up table which provides the pattern of ON drive signals that minimises clustering for each given level of brightness.

The controller may further comprise a cycle state counter which is connected to the look-up table with the look-up table in turn being connected to memory (e.g. RAM) containing segment data.

It will be appreciated that the controller may be viewed as providing drive signals to the electrodes of variable frequency. Thus, viewed from another aspect, the invention provides a controller for an electroluminescent display comprising means for selectively driving individual display segments at different frequencies from each other whereby the segments are illuminated at different levels of brightness. This is preferably achieved by means of a single frequency generator providing a signal of a first frequency and means to synthesise different frequencies from the first frequency to drive the segmens.

Although the use of signals that are either in-phase or in anti-phase with the common electrode provides a convenient implementation of the invention, it may be achieved using different phase relationships. For example, the drive signals to the segments may be controlled at a higher frequency than that of the common electrode. For example, if the segments are controlled at twice the frequency of the common electrode then a half-brightness signal would be provided by the drive signal being in phase during the first quarter of the cycle of the common electrode, out of phase during the next quarter, in phase during the next and then out of phase in the final quarter.

Another alternative is for the drive voltage signal applied to the segment by the controller always to have an identical a waveform and period to that applied to the common electrode, but for the two waveforms to be relatively phase-shifted by a variable number of degrees. As before, maximum brightness is provided by the signals always being in anti-phase, but to provide half-brightness the phase of the drive voltage may be shifted by 90 degrees. It will be appreciated that this enables a continuously variable level of brightness to be provided, albeit with the added complexity of varying the timing of the drive voltage.

Although the invention may be applied to simple displays or backlights having only a single element, or a number of elements each having the same brightness, the advantages of the invention are most effectively realised where the invention is applied to a controller for use with a multiple-segment display. Therefore, the controller is preferably arranged to provide separate control of the phase of a plurality of signals for controlling a corresponding plurality of segments. Thus, this preferred form of the invention allows individual segments within a multiple segment display to have different brightnesses whilst using only a single oscillator.

Thus, viewed from another aspect, the invention provides a controller for use with a multi-segment electroluminescent display, the controller providing an alternating voltage common output and a plurality of alternating voltage drive outputs for the segments, wherein, during each cycle, the controller causes the drive outputs to be either in phase or in anti-phase with the common output such that the brightness of the segments may be controlled.

In some multi-segment applications a comparatively large area may be illuminated at less than full brightness. In such a situation, the load on the power supply may become rather uneven because a large load is taken (say) every other cycle. Preferably, therefore different segments that are to be illuminated simultaneously are driven using drive signal patterns that are substantially out of phase with each other. In this way the duty cycle of the power supply is made more even.

Although various implementations are possible, the controller preferably comprises a control unit that provides control signals to a plurality of switches, the switches each controlling a drive signal for a segment. For example, the control signals may control a plurality of half H-bridges, the half H-bridges being connected to ground and to a high voltage DC supply (e.g. 50–250V), whereby the half H-bridges provide an AC drive voltage. (The term "ground" used herein does not necessarily mean earth potential; it refers to a common terminal, 0V rail, etc.)

Typically, one of said half H-bridges provides a common signal and the remaining H-bridges provide drive signals.

Preferably, the controller is combined with an electroluminescent display such that each segment of the display is connected to the common output of the controller and to one of the drive outputs so that the segments may each be driven at an independently variable level of brightness.

Therefore, viewed from another aspect, the invention provides an electroluminescent display in combination with a controller as described above.

These and other features of the present invention will become apparent upon review of the following detailed description of the invention when taken in conjunction with the drawings and appended claims.

BRIEF DESCRIPTION OF THE DRAWINGS

Certain embodiments of the invention will now be described, by way of example only, with reference to the accompanying drawings.

DETAILED DESCRIPTION OF THE INVENTION

Figure 1:
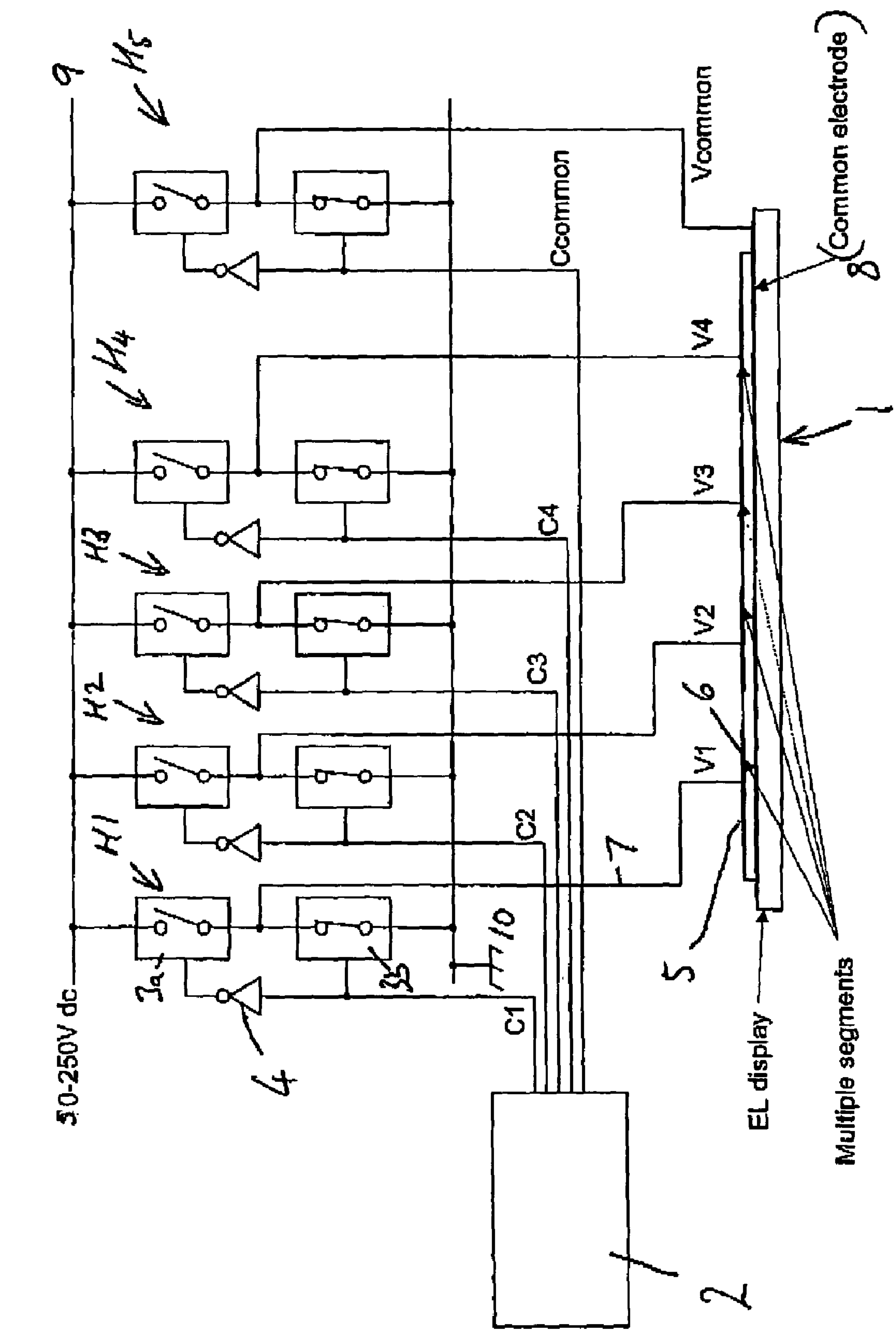
FIG. 1 is a schematic diagram illustrating the interconnections between a controller according to the invention and a display.

FIG. 1 shows a controller having the combination of output drivers required for a four-segment display 1. Control unit 2 is connected to five half H-bridges H1–H5 by conductors carrying control signals C1–C4 and Ccommon. Each half H-bridge comprises a pair of switches 3*a*, 3*b* in the form of MOSFET transistors and an inverter 4. The transistors are controlled by control signals C1–C4, the arrangement being such that when one switch of a pair is open, the other is closed.

The centre of each of half H-bridges H1–H4 is connected to the drive electrode 5 of one segment 6 of the display 1 via a conductor 7. The centre of half H-bridge H5 is connected to common electrode 8. The common electrode is made of a transparent conductive material and is connected to each segment in the known manner.

In addition, the half H-bridges are connected to a high-voltage supply 9 and to ground 10.

Control signals C1–C4 and Ccommon control the states of their respective half H-bridges H1–H5 such that the display drive signals (V1–4 and Vcommon) swing from 0V for a low-level control signal to the high voltage (typically in the region 50V to 250V) for a high-level control signal.

Figure 2:
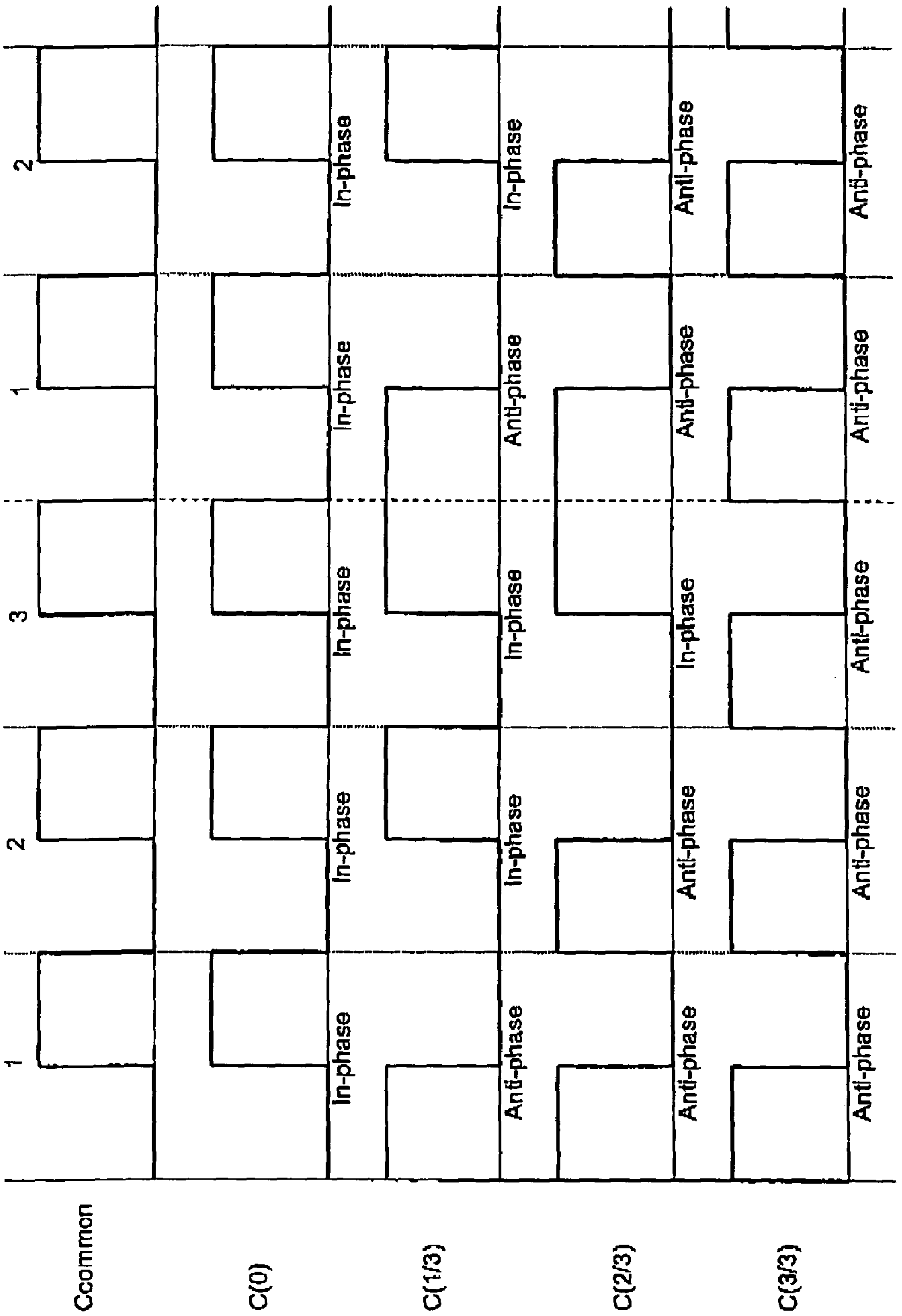
FIG. 2 is a phase diagram showing control signals produced by the controller.

FIG. 2 shows a set of control signal patterns C(0)–C(3/3) that would be applied to produce brightness levels of 0, 1/3, 2/3 and 3/3 of full brightness for the respective segment. It will be noted that each pattern repeats after three cycles of the Ccommon signal. Each control signal C1–C4 is selectively set to one of these patterns by the control unit 2 in order to provide the corresponding desired level of brightness. It will be noted that C(0) provides a signal that is always in phase with Ccommon. As a result, the segment is off. C(3/3), in contrast, is always in anti-phase with Ccommon and so the segment is lit at maximum brightness. C(1/3) is in anti-phase with Ccommon once every three cycles, providing one-third brightness and C(2/3) is in anti-phase twice every three cycles providing two-thirds brightness.

The foregoing embodiment is a simple one in that it only provides four levels of brightness to each of four segments. However, it will be appreciated that a higher number of segments may be driven if desired by correspondingly increasing the number of control signals C1–C4 output by the controller and the number of H-bridges. The number of levels of brightness may be increased by increasing the number of cycles of the common electrode signal Ccommon after which the patterns repeat. To provide M different levels of brightness (including "off" as one level) the control signals corresponding to groups of M−1 cycles form each repeating pattern.

Figure 3:
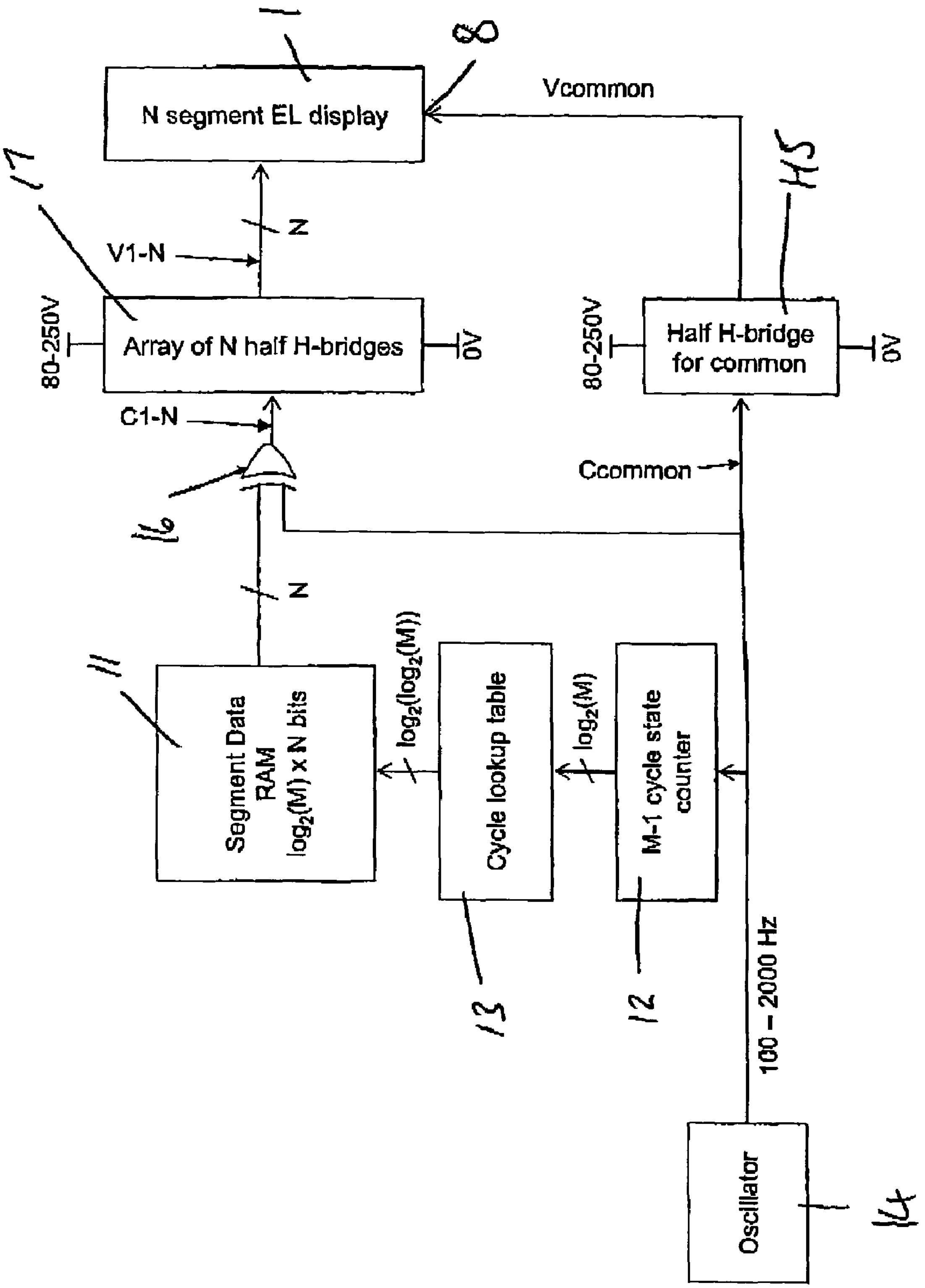
FIG. 3 is a schematic diagram of a controller according to the invention.

FIG. 3 shows a further embodiment of a controller that allows for M levels of variable brightness. If M is taken to be four then this controller can be used in the FIG. 1 embodiment. For clarity, like reference numerals refer to corresponding components.

In this figure a convention is used, whereby a connection crossed through with a slash "/" indicates a plurality of such connections in parallel, the number being indicated nearby.

Oscillator 14 provides a control signal Ccommon at 100–2000 Hz that is fed to half H-bridge H5 in order to produce the drive signal Vcommon for the common electrode 8 of multi-segment display 1.

The same signal is also fed to one input of each of a plurality of XOR (exclusive or) gates 16, one of which corresponds to each segment of the display. The output from each XOR gate is fed to a respective half H-bridge H1 etc. (part of array 17) that provides the drive signal V1 etc. to the corresponding segment's drive electrode.

The other input to the XOR gate is from segment data RAM 11. The latter component, together with cycle look-up table 13 and cycle state counter 12 determine at what times the segment is to be illuminated and the input to the XOR gate is set accordingly. Control signals C1 etc. are inverted by the Ccommon signal by means of XOR gates.

Determination of which segments are to be illuminated is made as follows. The binary representation of the required brightness for each segment is stored in the segment data RAM 11. A binary cycle state counter 12 is used to count the number of display cycles passed. The output of this counter is used as the address in a lookup table 13. Each address of the lookup table holds an address of the segment data RAM. The RAM addresses within the lookup table are arranged such that:

a) the number of occurrences of each address is proportional to the value of the binary bit it represents; and b) the occurrences of each address are spread through the repeat cycle to control unwanted output frequencies.

These conditions mean that the segment is ON for the correct number of cycles to produce the desired brightness whilst ensuring that clustering of the ON signals is minimised.

As an example, to produce a 32 segment display with 16 levels of variable brightness requires a 4×32 bit RAM. This RAM has 4 locations, each holding a 32-bit segment word. The 4 locations (0,1,2 & 3) correspond to the 4 bits describing the brightness (0,1,2 & 3).

The effect of the lookup table is that for every 15 cycles, the segment word in location 0 is displayed once, the word in location 1 is displayed twice, the word in location 2 is displayed four times and the word in location 3 is displayed eight times. A segment required at full brightness will have a '1' in each of the four locations. It will therefore be displayed in 15 out of 15 cycles.

It should be apparent that the foregoing relates only to the preferred embodiments of the present invention and that numerous changes and modification may be made herein without departing from the spirit and scope of the invention u defined by the following claims and the equivalents thereof.

The invention claimed is:

1. A display controller for use with an electroluminescent display, the controller being arranged to vary the relative phase of signals applied to illuminated segment(s) of the display whereby the brightness of the segment(s) being varied, wherein the controller comprises a look-up table which provides a pattern of drive signals and a cycle state counter which is connected to the look-up table, the look-up table in turn being connected to memory containing segment data and wherein the controller further controls the phase of the signals on a cycle-by-cycle basis such that it applies drive signals to the or each segment which are either in phase or in anti-phase with a common signal applied to that segment, whereby the proportion of the signals that are in anti-phase determines the brightness of the segment.

2. The display controller as claimed in claim 1, wherein the controller controls the phase of the signals such that a drive signal applied to the or each segment always has an identical waveform to a common signal applied to that segment, but the waveforms of the drive and common signals are selectively relatively phase-shifted by a variable number of degrees in order to determine the brightness of the segment.

3. The display controller as claimed in claim 1, wherein there are provided at least sixteen levels of brightness.

4. The display controller as claimed in claim 1, wherein there are provided at least thirty-two levels of brightness.

5. The display controller as claimed in claim 1, arranged to provide separate control of the phase of a plurality of signals for controlling a corresponding plurality of segments of a multi-segment display.

6. The display controller as claimed in claim 1, wherein the controller minimizes clustering of ON drive signals in the pattern of ON and OFF signals provided for each level of brightness.

7. The display controller as claimed in claim 1, the controller being arranged to illuminate a plurality of different segments simultaneously such that the segments are driven using drive signal patterns that are substantially out of phase with each other.

8. The controller as claimed in claim 1, wherein the controller comprises a control unit that provides control signals to a plurality of switches, the switches each controlling a drive voltage for a segment.

9. The controller as claimed in claim 8 wherein said control signals control a plurality of half H-bridges, the terminals of the half H-bridges being connected respectively to ground and to a high voltage DC supply, whereby the half H-bridges provide an AC drive voltage.

10. The controller as claimed in claim 9, wherein one of said half H-bridges provides a common signal and the remaining H-bridges provide drive signals.

11. An electroluminescent display in combination with the controller as claimed in claim 1.

12. A controller for use with a multi-segment electroluminescent display, the controller providing an alternating voltage common output and a plurality of alternating voltage drive outputs for the segments, wherein, during each cycle, the controller causes the drive outputs to be either in phase or in anti-phase with the common output such that the brightness of the segments being controlled.

13. The controller as claimed in claim 12, wherein the controller comprises a control unit that provides control signals to a plurality of switches, the switches each controlling a drive voltage for a segment.

14. The controller as claimed in claim 13, wherein said control signals control a plurality of half H-bridges, the terminals of the half H-bridges being connected respectively to ground and to a high voltage DC supply, whereby the half H-bridges provide an AC drive voltage.

15. The controller as claimed in claim 14, wherein one of said half H-bridges provides a common signal and the remaining H-bridges provide drive signals.

16. The electroluminescent display in combination with a controller as claimed in claim 12.

* * * * *

UNITED STATES PATENT AND TRADEMARK OFFICE
CERTIFICATE OF CORRECTION

PATENT NO. : 7,075,240 B2
APPLICATION NO. : 10/62851
DATED : July 11, 2006

INVENTOR(S) : Christopher James Newton Fryer et al.

It is certified that error appears in the above-identified patent and that said Letters Patent is hereby corrected as shown below:

On the Page 8, Col. 8, Claim 12, line 23, please delete the word “being” after “segments” and before “controlled.” and insert the words --may be--.

Signed and Sealed this

Nineteenth Day of December, 2006

JON W. DUDAS
*Director of the United States Patent and Trademark Office*

UNITED STATES PATENT AND TRADEMARK OFFICE

CERTIFICATE OF CORRECTION

PATENT NO. : 7,075,240 B2
APPLICATION NO. : 10/628581
DATED : July 11, 2006
INVENTOR(S) : Christopher James Newton Fryer et al.

It is certified that error appears in the above-identified patent and that said Letters Patent is hereby corrected as shown below:

On the Page 8, Col. 8, Claim 12, line 23, please delete the word “being” after “segments” and before “controlled.” and insert the words --may be--.

This certificate supersedes Certificate of Correction issued December 19, 2006.

Signed and Sealed this

Thirtieth Day of January, 2007

JON W. DUDAS

*Director of the United States Patent and Trademark Office*